US 8,096,148 B2

(12) United States Patent
Kawai

(10) Patent No.: US 8,096,148 B2
(45) Date of Patent: Jan. 17, 2012

(54) METHOD FOR FABRICATING A GLASS SUBSTRATE, MAGNETIC DISK, AND METHOD FOR FABRICATING THE SAME

(75) Inventor: Hideki Kawai, Kobe (JP)

(73) Assignee: Konica Minolta Opto, Inc., Tokyo (JP)

(*) Notice: Subject to any disclaimer, the term of this patent is extended or adjusted under 35 U.S.C. 154(b) by 154 days.

(21) Appl. No.: 11/824,767

(22) Filed: Jul. 2, 2007

(65) Prior Publication Data

US 2008/0026260 A1    Jan. 31, 2008

(30) Foreign Application Priority Data

Jul. 3, 2006  (JP) ................. 2006-183093

(51) Int. Cl.
C03C 19/00 (2006.01)
C03C 3/06 (2006.01)
G11B 5/706 (2006.01)
C03C 10/00 (2006.01)

(52) U.S. Cl. ............... 65/377; 65/29.12; 451/8; 451/41; 428/486.9; 428/848.2

(58) Field of Classification Search ............... 65/84, 31, 65/88, 377, 29.12; 216/97, 100, 84; 451/41, 451/8, 28, 43, 42, 44; 369/275.1, 272.1; 428/1.1, 847.2, 141, 846.9, 848.8, 848.2; 360/215, 135; 501/9, 69, 4; 257/288; 427/402, 427/130; 438/5, 692
See application file for complete search history.

(56) References Cited

U.S. PATENT DOCUMENTS

| | | | |
|---|---|---|---|
| 6,533,644 B1 * | 3/2003 | Horie et al. ............ 451/36 |
| 6,553,788 B1 * | 4/2003 | Ikeda et al. ............ 65/31 |
| 6,972,135 B2 * | 12/2005 | Homola ............... 427/130 |
| 2001/0040143 A1 * | 11/2001 | Jang et al. ............ 216/31 |
| 2002/0015863 A1 | 2/2002 | Nakajima et al. |
| 2002/0142191 A1 * | 10/2002 | Sakai et al. ............ 428/848 |
| 2002/0193233 A1 * | 12/2002 | Kishimoto et al. ........ 501/69 |
| 2003/0031877 A1 * | 2/2003 | Veerasamy et al. ....... 428/426 |
| 2003/0090833 A1 * | 5/2003 | Tani et al. ............ 360/110 |

(Continued)

FOREIGN PATENT DOCUMENTS

| | | |
|---|---|---|
| JP | 2001-27623 A | 1/2001 |
| JP | 2001-281180 A | 10/2001 |
| JP | 2001-312817 A | 11/2001 |
| JP | 2002-030275 | 1/2002 |
| JP | 2005-129163 | 5/2005 |

OTHER PUBLICATIONS

Translation JP 2001-027623, Jan. 2001.*

(Continued)

*Primary Examiner* — Kevin M. Bernatz
*Assistant Examiner* — Louis Falasco
(74) *Attorney, Agent, or Firm* — Brinks, Hofer, Gilson & Lione

(57) ABSTRACT

A method for fabricating a glass substrate containing $SiO_2$ as a main ingredient thereof and having a uniform and minute pattern of stripes formed on the surface thereof by ultraprecision polishing includes a step of inspecting whether or not, at the topmost surface portion of the glass substrate after polishing, a given property of a bound energy of the Si atom with respect to the electrons occupying a 2P orbit as determined by XPS is equal to or less than a predetermined value, and the given property is a shift amount of the bound energy or a half-value width of the bound energy distribution, the predetermined value is 0.10 eV or 2.15 eV, respectively.

6 Claims, 3 Drawing Sheets

U.S. PATENT DOCUMENTS

| | | | |
|---|---|---|---|
| 2004/0018362 A1* | 1/2004 | Nakajima et al. | 428/428 |
| 2004/0037005 A1* | 2/2004 | Osawa | 360/135 |
| 2004/0052977 A1* | 3/2004 | Ogawa et al. | 428/1.1 |
| 2005/0008822 A1* | 1/2005 | Miyamoto et al. | 428/141 |
| 2005/0055885 A1* | 3/2005 | Obeng | 51/293 |
| 2005/0096210 A1* | 5/2005 | Kawai | 501/69 |
| 2005/0215414 A1* | 9/2005 | Kawai | 501/69 |
| 2006/0003438 A1* | 1/2006 | Engstrom et al. | 427/402 |
| 2006/0006433 A1* | 1/2006 | Lewis et al. | 257/288 |

OTHER PUBLICATIONS

Translation JP 2001-281180, Oct. 2001.*

International Search Report in International Application No. PCT/JP2007/062867 dated Aug. 7, 2007, 2 pages.

* cited by examiner

METHOD FOR FABRICATING A GLASS SUBSTRATE, MAGNETIC DISK, AND METHOD FOR FABRICATING THE SAME

This application is based on Japanese Patent Application No. 2006-183093 filed on Jul. 3, 2006, the contents of which are hereby incorporated by reference.

BACKGROUND OF THE INVENTION

1. Field of the Invention

The present invention relates to a method for fabricating a glass substrate, to a magnetic disk, and to a method for fabricating it. More particularly, the present invention relates to a method for fabricating a glass substrate for use in a magnetic disk (hereinafter also called "magnetic disk"), to a magnetic disk using such a glass substrate, and to a method for fabricating such a magnetic disk.

2. Description of Related Art

Conventionally, as substrates for magnetic disks, there have generally been used aluminum substrates in stationary devices such as desktop computers and servers, and glass substrates in portable devices such as notebook computers and mobile computers. One disadvantage with aluminum substrates is that they are easy to deform and are not hard enough, offering not quite satisfactory smoothness on the substrate surface after polishing. Another disadvantage is that, if a magnetic head happens to touch a magnetic disk, the magnetic film on an aluminum substrate is prone to exfoliate from the substrate. Under this background, it is expected that glass substrates, less prone do deformation, offering better surface smoothness, and affording higher mechanical strength, will be increasingly used not only in portable but also in stationary devices and in other home information appliances.

Generally, a magnetic disk is fabricated by polishing the surface of a glass substrate into a mirror surface, then treating the surface by ultraprecision polishing, and then forming a magnetic layer on the glass substrate by, for example, sputtering. Here, ultraprecision polishing is achieved by, for example, texturing—whereby a pattern of stripes in the shape of concentric circles is formed on the glass substrate surface by polishing using tape—or by mirror polishing—which gives priority to further improving the smoothness on the polished surface while leaving a less conspicuous pattern of stripes. In a magnetically anisotropic recording medium, texturing gives a magnetic disk medium magnetic anisotropy; this improves the magnetic characteristics thereof as a magnetic disk, and also prevents attraction between a magnetic head and the surface of the magnetic disk when a hard disk drive is out of operation. On the other hand, in an isotropic medium such as a perpendicular magnetic disk, mirror polishing greatly improves the smoothness on the substrate surface; this gives the magnetic layer formed on the substrate a fine, uniform structure, and offers greatly improved magnetic recording characteristics. Generally, texturing or mirror polishing of a glass substrate is achieved in the following manner: while a texturing liquid having abrasive particles dispersed in water or a solution containing water as a main ingredient thereof is supplied to the glass substrate surface, polishing cloth or polishing tape of a woven or non-woven fabric or the like is pressed against the glass substrate surface, and the glass substrate is moved.

The recording capacity of a magnetic disk can be increased by reducing the distance between the surface thereof and a magnetic head. Inconveniently, however, with a reduced distance between a magnetic head and the surface of a magnetic disk, if there is an abnormal projection formed on or foreign matter adhered to the surface of a glass substrate, the magnetic head collides with the projection or foreign matter.

Thus, to make it possible to increase the recording capacity of a magnetic disk by reducing the distance from the surface thereof to a magnetic head, it is necessary to eliminate formation of abnormal projections on the surface of a glass substrate, and to form a more uniform and minute pattern of stripes.

In this connection, for example, JP-A-2002-030275 proposes the use of a special texturing liquid for the purpose of forming a uniform and minute pattern of stripes. On the other hand, JP-A-2005-129163, though not directly aiming at improving the effect of ultraprecision polishing, discloses giving the surface layer of a glass substrate a coarse structure with a view to improving the toughness of a information recording glass substrate, alleviating a lowering in strength due to micro-cracks, and reducing the incidence of cracks on collision with a magnetic head.

Inconveniently, however, in actual fabrication, even when glass substrates of the same composition are treated by ultraprecision polishing using the same treatment liquid, the pattern of stripes in the shape of concentric circuits formed on the glass substrates occasionally varies slightly from lot to lot.

Variations in the pattern of stripes on the surface of glass substrates lead to variations in the magnetic characteristics in the magnetic disks formed therewith, and this is undesirable in practical terms.

SUMMARY OF THE INVENTION

In view of the above described problem, it is an object of the present invention to provide a method for fabricating a glass substrate having a uniform and minute pattern of stripes formed on the surface thereof by ultraprecision polishing.

It is another object of the present invention to provide a magnetic disk that allows the recording capacity thereof to be increased through a reduction of the distance between a magnetic head and the surface of the magnetic disk and to provide a manufacturing method for the magnetic disk.

The inventors of the present invention have intensively studied possible mechanisms that cause the pattern of stripes in the shape of concentric circles formed on a surface of glass substrates to vary slightly from lot to lot even when glass substrates of the same composition are treated by ultraprecision polishing using the same treatment liquid. Through the study, the inventors have discovered that fine structure which is shown by bonding state of Si atom, of a glass substrate at the surface thereof affects a pattern of formed stripes thereon, and this discovery has led to the present invention. Specifically, a glass substrate having a fine surface structure allows a uniform and minute pattern of stripes to be formed thereon by ultraprecision polishing; in contrast, a glass substrate having a coarse surface structure causes a non-uniform pattern of stripes to be formed thereon by ultraprecision polishing.

No reasonable explanation has up to now been given for the cause of variations in the state of bond of the Si atom which governs the glass structure at the surface of a glass substrate. It is, however, supposed to be because, when a glass substrate is cleaned before ultraprecision polishing, its surface is eroded by the cleaning liquid, such as a weakly alkaline liquid or hydrofluoric acid, exerting an etching effect.

According to a first aspect of the present invention, a method for fabricating a glass substrate containing $SiO_2$ as a main ingredient thereof includes: a step of polishing the surface of the glass substrate; and a step of inspecting the polished glass substrate to check whether or not, at the topmost surface portion thereof, a given property of a bound energy of the Si atom with respect to the electrons occupying a 2P orbit as determined by XPS is equal to or less than a predetermined value.

According to a second aspect of the present invention, the given property may be a shift amount of the bound energy, and the predetermined value may be 0.10 eV.

According to a third aspect of the present invention, the given property may be a half-value width of the distribution of the bound energy, and the predetermined value may be 2.15 eV.

According to a fourth aspect of the present invention, the method may further include, between the polishing step and the inspecting step, a step of cleaning the surface of the glass substrate with a cleaning liquid exerting an etching effect.

According to a fifth aspect of the present invention, the cleaning liquid may be hydrofluoric acid.

According to a sixth aspect of the present invention, the method may further include a step of performing ultraprecision polishing on the glass substrate when the glass substrate has passed the inspecting step.

According to a seventh aspect of the present invention, after ultraprecision polishing, the topmost surface portion of the glass substrate may have a surface roughness Ra of 0.3 nm or less.

According to an eighth aspect of the present invention, a method for fabricating a magnetic disk includes a step of forming a magnetic recording layer on a glass substrate fabricated by the method of one of the above described aspects of the present invention.

According to a ninth aspect of the present invention, a magnetic disk is fabricated by the method described above.

In the glass substrate of the present invention, before ultraprecision polishing, at the topmost surface portion of the glass substrate, the bound energy of the Si atom with respect to the electrons occupying the 2P orbit as determined by XPS is such that the shift amount of the bound energy equals 0.10 eV or less, or such that the half-value width of the distribution of the bound energy equals 2.15 eV or less. This keeps stable the state of bond of the Si atom which governs the glass structure at the surface of the glass substrate, and allows a uniform and minute pattern of stripes to be formed on the glass substrate surface by texturing. The uniform and minute pattern of stripes so formed on the glass substrate gives uniform magnetic characteristics to the magnetic disk formed therewith. Also in cases where an ultrasmooth surface is formed by mirror polishing, it is possible to obtain a uniform and smooth surface all over the glass substrate. By making the surface of the glass substrate extremely smooth and uniform, it is possible to obtain uniform, low-noise magnetic characteristics with the magnetic disk formed therewith.

With the method of any one of the above described aspects of the present invention, it is possible to reduce the distance between a magnetic head and the surface of the magnetic disk, and thus to increase the recording capacity thereof.

With the fabrication method of the present invention, the use of the glass substrate described above allows a uniform and minute pattern of stripes to be formed on the glass substrate surface by texturing; it also allows the surface of the glass substrate to be made extremely smooth and uniform by mirror polishing.

DETAILED DESCRIPTION OF PREFERRED EMBODIMENTS

Figure 3:
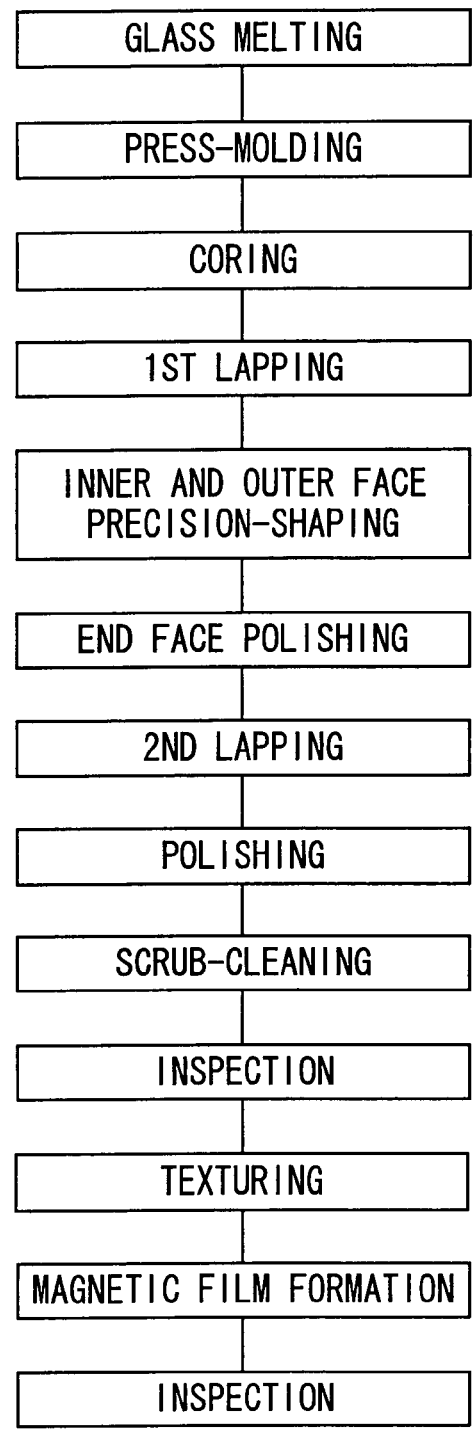
FIG. 3 is a diagram to show an example of a process for fabricating a magnetic disk according to the present invention.

Hereinafter, a method for fabricating a magnetic disk which uses a method for fabricating a glass substrate according to the present invention will be described. FIG. 3 shows an example of the process for fabricating the magnetic disk. First, a glass material is melted (a glass melting step). The melted glass is then poured into a lower mold, and is then molded by being pressed with an upper mold into a disk-shaped glass substrate precursor (a press-molding step). Here, the disk-shaped glass substrate precursor may be formed, instead of by press-molding, by cutting it with an abrasive grindstone out of sheet glass formed, for example, by down-drawing or floating.

There is no particular restriction on the material of the glass substrate of the present invention, except that it contains, as a main ingredient thereof, a 30% or more by weight of $SiO_2$. Examples of the material include: soda-lime glass, of which the main ingredients are silicon dioxide, sodium oxide, and calcium oxide; aluminosilicate glass, of which the main ingredients are silicon dioxide, aluminum oxide, and $R_2O$ (where R=K, Na, Li); borosilicate glass; lithium oxide-silicon dioxide glass; lithium oxide-aluminum oxide-silicon dioxide glass; R'O-aluminum oxide-silicon dioxide glass (where R'=Mg, Ca, Sr, Ba). Any of these glass materials may have zirconium oxide, titanium oxide, or the like added thereto.

There is no particular restriction on the size of the glass substrate. The method of the present invention is applicable to 2.5-inch, 1.8-inch, 1-inch, and 0.85-inch disks and even disks with smaller diameters, and to 2 mm thick, 1 mm thick, and 0.63 mm thick disks and even disks with smaller thicknesses.

As necessary, in a central portion of the press-molded glass substrate precursor, a hole is formed with a core drill or the like (a coring step). Then, in a first lapping step, the surface of the glass substrate on both sides is ground, and thereby the overall shape of the glass substrate is preliminarily adjusted in terms of the parallelism, flatness, and thickness thereof. Next, the outer and inner circumferential edge faces of the glass substrate are ground and chamfered, and thereby fine adjustments are made in the exterior dimensions and roundness of the glass substrate, the inner diameter of the hole, and the concentricity between the glass substrate and the hole (an inner and outer face precision-shaping step). Then, the outer and inner circumferential edge faces of the glass substrate are polished to remove minute scratches and the like (an end face polishing step).

Next, the surface of the glass substrate on both sides is ground again, and thereby fine adjustments are made in the parallelism, flatness, and thickness of the glass substrate (a second lapping step). Then, the surface of the glass substrate on both sides is polished, and thereby the surface irregularities on the glass substrate surface are leveled (a polishing step). As necessary, the surface of the glass substrate on both sides may be further polished with an abrasive with a different grain size (a second polishing step).

The glass substrate is then cleaned; thereafter, a sample of the glass substrate extracted as a representative one is inspected by XPS for fineness of the surface thereof. The inspection here involves a check of whether or not the shift amount of the bound energy of the Si atom with respect to the electrons occupying the 2P orbit as determined by XPS is equal to or less than a predetermined value, or a check of whether or not the half-value width of the bound energy distribution of the Si atom with respect to the electrons occupying the 2P orbit as determined by XPS is equal to or less than a predetermined value.

In the present invention, "XPS" denotes X-ray photoelectron spectroscopy. The bound energy of the Si atom is measured using a spectrometer, model "ESCALab 200R", manufactured by VG Corporation, under the following conditions: anode: Mg (600 W); TOA: 90°; lens mode: large; PE: 100/10 eV (survey/state analysis). For analysis of the bound energy in the depth direction, Ar ion etching may be used in combination.

Moreover, in the present invention, "the half-value width of the bound energy distribution" denotes the difference between bound energy values at which the bound energy is half as high as at the peak of the bound energy distribution.

In a glass substrate according to a first embodiment of the present invention, an indicator is used that indicates the fineness of the glass substrate surface, that is, the state of bond of the Si atom there. The indicator here is the shift amount of the bound energy of the Si atom with respect to the electrons occupying the 2P orbit as determined by XPS. The smaller the shift amount of the bound energy of the Si atom with respect to the electrons occupying the 2P orbit, the more stable the state of bond of the Si atom. In the glass substrate of the first embodiment, the shift amount is defined to be 0.10 eV or less. If the shift amount of the bound energy of the Si atom with respect to the electrons occupying the 2P orbit is larger than 0.10 eV, the state of bond of the Si atom at the glass substrate surface portion is so unstable that the glass substrate is brittler than its structure intrinsically is, making the pattern of stripes formed by texturing partly disturbed thus non-uniform. On the other hand, in a case where mirror polishing is performed, a non-uniform surface condition may result with the surface smoothness varying from part to part in the order less than a micron. A more preferable range of the shift amount of the bound energy of the Si atom with respect to the electrons occupying the 2P orbit is 0.07 eV or less.

Figure 1:
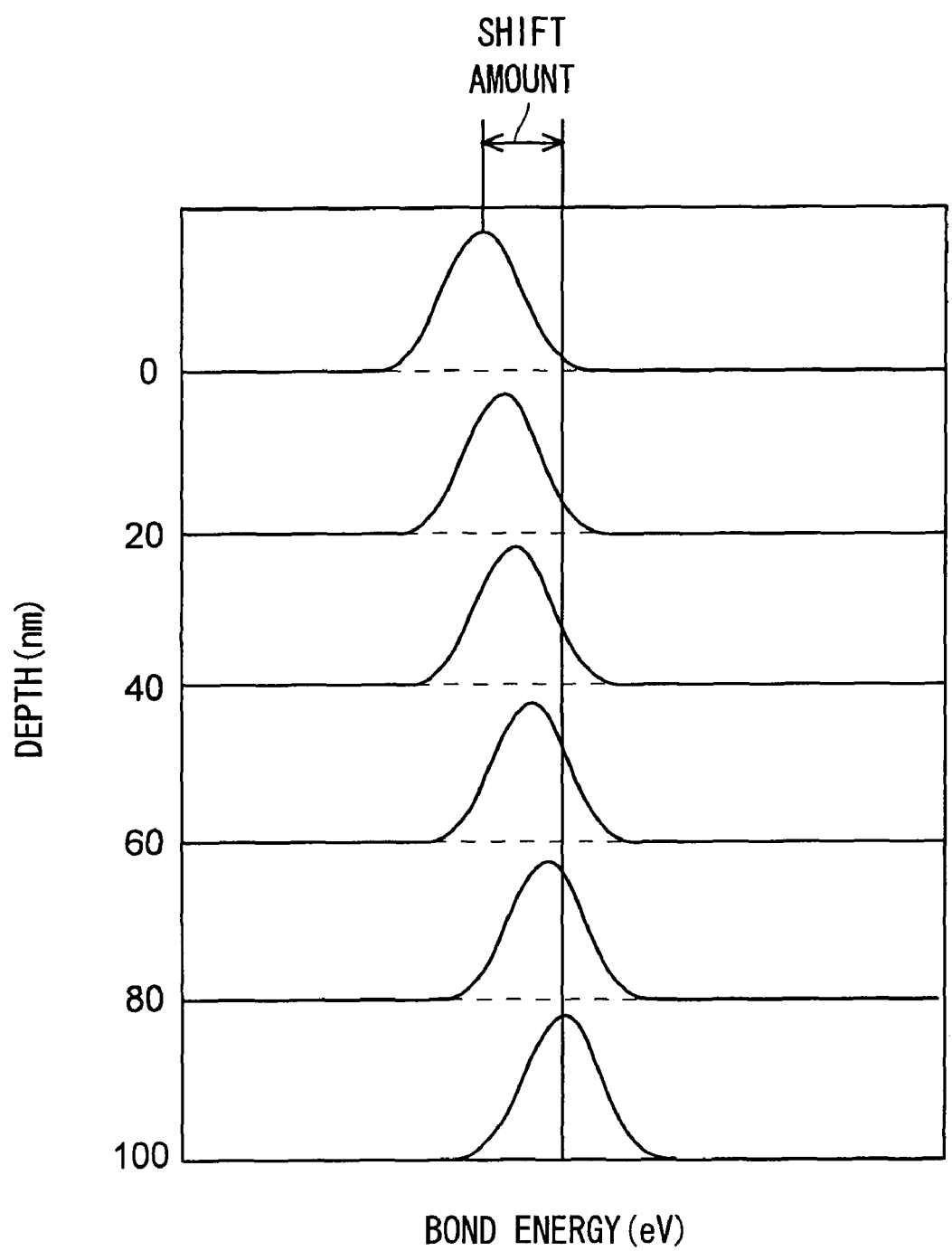
FIG. 1 is a diagram to show an example of the bound energy observed in the depth direction of a glass substrate according to a first embodiment of the present invention.

FIG. 1 shows an example of the bound energy of the Si atom with respect to the electrons occupying the 2P orbit as measured by XPS. FIG. 1 shows the distribution of the bound energy of the Si atom at different depths from the glass substrate surface to 100 nm deep, with the bound energy represented along the horizontal axis. As will be understood form this figure, as one goes from 100 nm deep in the glass substrate toward the surface thereof (this range of depth means "topmost surface portion" in the present invention), the peak of the bound energy distribution of the Si atom with respect to the electrons occupying the 2P orbit shifts gradually leftward in the figure, that is, to the high-energy side. Since the state of bond of the Si atom is more stable at a depth of around 100 nm from the glass substrate surface than at the glass substrate surface, it is preferable that the bound energy of the Si atom with respect to the electrons occupying the 2P orbit at the glass substrate surface portion be not much shifted from that at a depth of 100 nm. Accordingly, in the first embodiment, the shift amount of the bound energy is defined to be 0.10 eV or less. In the embodiment above, the topmost surface portion is taken in a range from the top surface to 100 nm. Because variation of properties of bound energy is different due to material of the glass substrate and the like, the present invention should not be understood in the above described restricted and it should be understood that the topmost surface portion means from the top surface to a depth where the properties of bound energy become stable.

In a glass substrate according to a second embodiment of the present invention, another indicator is used that indicates the state of bond of the Si atom. The indicator here is the half-value width of the distribution of the bound energy of the Si atom with respect to the electrons occupying the 2P orbit as determined by XPS. The smaller the half-value width of the bound energy distribution of the Si atom, the more stable the state of bond of the Si atom. In the glass substrate of the second embodiment, the half-value width of the bound energy distribution of the Si atom with respect to the electrons occupying the 2P orbit at the topmost surface portion of the glass substrate as determined by XPS is defined to be 2.15 eV or less. If the half-value width of the bound energy distribution of the Si atom with respect to the electrons occupying the 2P orbit at the topmost surface portion of the glass substrate is larger than 2.15 eV, the state of bond of the Si atom at the glass substrate surface is so unstable that it may be impossible to form a uniform and minute pattern of stripes on the glass substrate surface by texturing. A more preferable range of the half-value width of the bound energy distribution of the Si atom at the topmost surface portion of the glass substrate is 2.10 eV or less.

Figure 2:
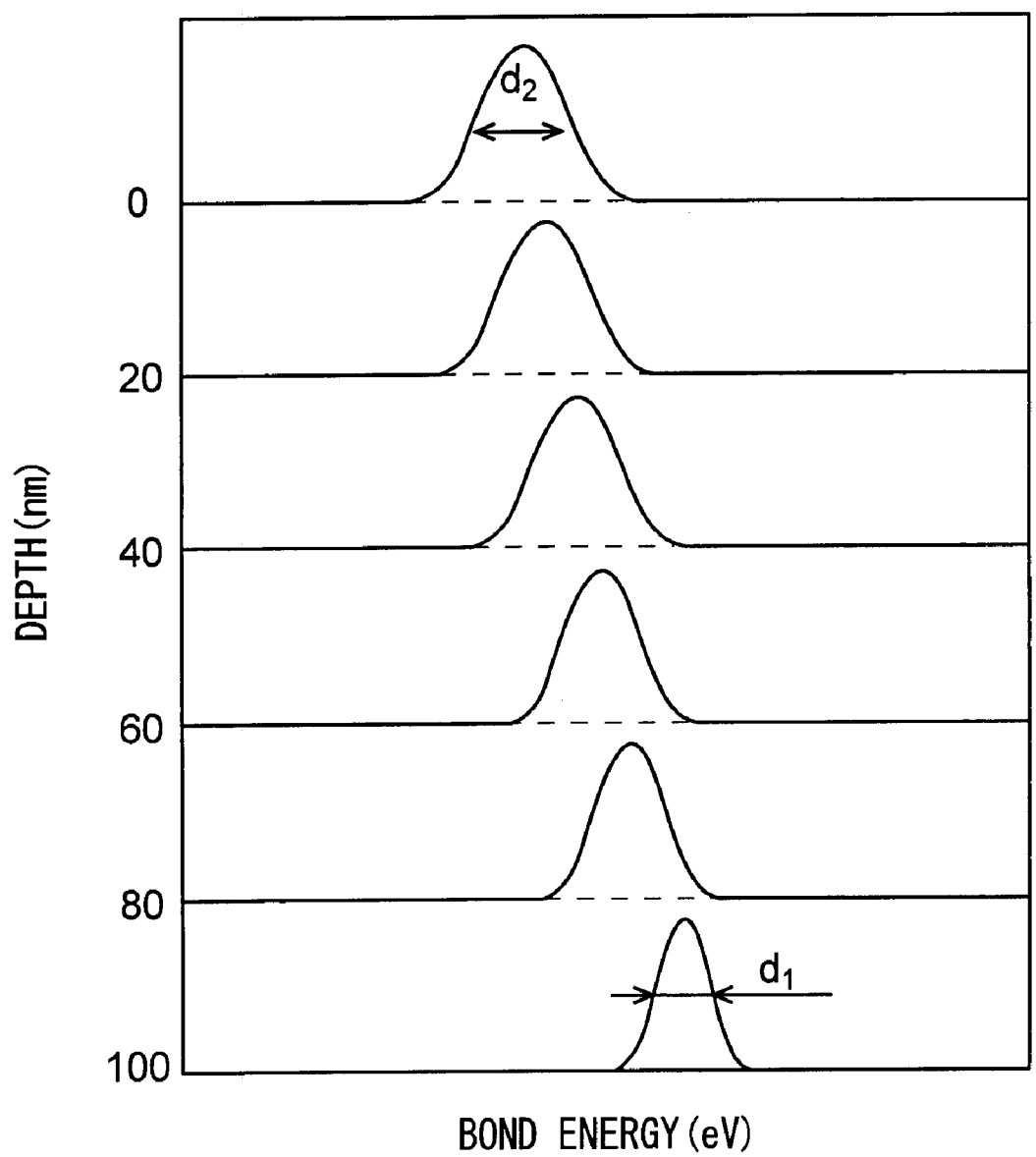
FIG. 2 is a diagram to show an example of the bound energy observed in the depth direction of a glass substrate according to a second embodiment of the present invention.

FIG. 2 shows an example of the bound energy distribution of the Si atom as measured by XPS. FIG. 2 shows the bound energy distribution of the Si atom at different depths from the glass substrate surface to 100 nm deep, with the bound energy represented along the horizontal axis. As will be understood form this figure, the half-value width of the bound energy distribution of the Si atom is largest (d2 in the figure) at the topmost surface portion of the glass substrate, and it becomes decreasingly small as one goes deeper from the glass substrate surface (at a depth of 100 nm, the half-value width of the bound energy distribution of the Si atom is d1). Accordingly, in the glass substrate of the second embodiment, the half-value width of the bound energy distribution of the Si atom at the topmost surface portion of the glass substrate is defined.

When the glass substrate passes the inspection, it is then subjected to ultraprecision polishing. Here, an ultraprecision polishing liquid is used that has abrasive particles dispersed evenly in a liquid in a way that the abrasive particles do not precipitate while the liquid is in storage; specifically, used as such an ultraprecision polishing liquid is slurry having about 0.01% to 5% by weight of abrasive particles dispersed in a water solution containing about 1% to 25% by weight of a glycol compound surfactant such as polyethylene glycol or polypropylene glycol.

An example of the abrasive particles is monocrystalline or polycrystalline diamond particles. Diamond particles have a regular particles shape, have a uniform particle size and shape, are hard, and are excellently resistant to chemicals and heat. In particular, polycrystalline diamond particles have, compared with monocrystalline counterparts, a more round particle shape, with rounded corners, and are widely used as abrasive particles for ultraprecision polishing.

It is preferable that, after ultraprecision polishing, the topmost surface portion of the glass substrate have a surface roughness Ra of 0.3 nm or less. In the magnetic disk as an end product, a surface roughness larger than 0.3 nm here makes it impossible to reduce the distance between a magnetic head and the surface of the magnetic disk, and thus to increase the recording capacity of the magnetic disk.

Next, on the glass substrate fabricated as described above, a magnetic film is formed. The magnetic film can be formed by a conventionally known method, for example, by spin-coating the substrate with a thermosetting resin having magnetic particles dispersed therein, by sputtering, or by electroless plating. Spin-coating provides a film thickness of about 0.3 μm to 1.2 μm, sputtering provides a film thickness of about 0.04 μm to 0.08 μm, and electroless plating provides a film thickness of about 0.05 μm to 0.1 μm. To reduce the film thickness and to obtain a high density, it is preferable to adopt sputtering or electroless plating.

There is no particular restriction on the material of the magnetic film; it may be any conventionally known magnetic material. To obtain a high coercivity, it is suitable to use, for example, an alloy of Co that is based on Co, having high crystal anisotropy, and that has Ni or Cr added thereto to adjust the residual flux density. Specifically, examples of such magnetic materials containing Co as a main ingredient thereof include: CoPt, CoCr, CoNi, CoNiCr, CoCrTa, CoPtCr, CoNiPt, CoNiCrPt, CoNiCrTa, CoCrPtTa, CoCrPtB, and CoCrPtSiO. To reduce noise, the magnetic film may be divided with a non-magnetic film (e.g., Cr, CrMo, or CrV) to have a multiple-layer structure (e.g., CoPtCr/CrMo/CoPtCr, CoCrPtTa/CrMo/CoCrPtTa). Other than the magnetic materials mentioned above, it is also possible to use: a ferrite material; an iron-rare earth metal material; or a granular material having magnetic particles of Fe, Co, FeCo, CoNiPt, or the like dispersed in a non-magnetic film of $SiO_2$, BN, or the like. The magnetic film may be for either of the longitudinal and perpendicular types of recording.

For smoother sliding of a magnetic head, a thin coat of a lubricant may be applied to the surface of the magnetic film. An example of the lubricant is perfluoropolyether (PFPE), a liquid lubricant, diluted with a solvent of the Freon family or the like.

As necessary, an underlayer or a protective layer may additionally be provided. In a magnetic disk, what underlayer to provide is determined to suit the magnetic film. The material of the underlayer is, for example, one or more selected from the group of non-magnetic metals including Cr, Mo, Ta, Ti, W, V, B, Al, and Ni. With a magnetic film containing Co as a main ingredient thereof, it is preferable to use the simple substance of or an alloy of Cr. The underlayer is not limited to one having a single layer, but may be one having a multiple-layer structure having a plurality of layers of the same material or of different materials laid on one another. Examples of multiple-layer underlayers include: Cr/Cr, Cr/CrMo, Cr/CrV, NiAl/Cr, NiAl/CrMo, and NiAl/CrV.

Examples of protective layers for preventing wear and corrosion of the magnetic film include: a Cr layer, a Cr alloy layer, a carbon layer, a carbon hydride layer, a zirconia layer, and a silica layer. Any of these protective layers can be formed continuously with the underlayer, the magnetic film, etc. on in-line sputtering equipment. Any of those protective layers may be provided in a single layer, or more than one of them, of the same material or of different material, may be provided in multiple layers. In addition to, or instead of, this or these protective layers, another protective layer may be formed. For example, instead of the above protective layers, a silicon dioxide ($SiO_2$) layer may be formed by applying to the top of the Cr layer minute particles of colloidal silica dispersed in tetraalkoxysilane diluted with a solvent of the alcohol family and then baking the applied layer.

Practical Example 1

An aluminosilicate glass substrate containing 55% by weight of $SiO_2$ was polished and cleaned so that the shift amount of the bound energy at the surface portion was 0.07 eV. When texturing was then performed over the entire surface of the glass substrate, a uniform pattern of stripes in the shape of concentric circles was obtained thereon. When a magnetic film was then formed on this glass substrate, a uniform magnetic orientation in the shape of concentric circles was observed, and good magnetic recording/reproducing characteristics were obtained.

Practical Example 2

A soda-lime glass substrate containing 65% by weight of $SiO_2$ was polished and cleaned so that the shift amount of the bound energy at the surface was 0.09 eV. When texturing was then performed over the entire surface of the glass substrate, a uniform pattern of stripes in the shape of concentric circles was obtained thereon. When a magnetic film was then formed on this glass substrate, a uniform magnetic orientation in the shape of concentric circles was observed, and good magnetic recording/reproducing characteristics were obtained.

Practical Example 3

A non-alkali glass substrate containing 50% by weight of $SiO_2$ was polished and cleaned so that the shift amount of the bound energy at the surface was 0.03 eV. When mirror polishing was then performed on the glass substrate, an ultrasmooth surface having a roughness of Ra=0.15 nm was obtained uniformly all over the surface thereof. When a perpendicular magnetic film was then formed on this glass substrate, a film of minute and uniform magnetic particles was obtained, and good magnetic signal reproduction characteristics were obtained.

Practical Example 4

An aluminoborosilicate glass substrate containing 60% by weight of $SiO_2$ was polished and cleaned so that the half-value width of the bound energy at the surface was 2.05 eV. When texturing was then performed on the glass substrate, a uniform pattern of stripes in the shape of concentric circles was obtained over the entire surface thereof. When a magnetic film was then formed on this glass substrate, a uniform magnetic orientation in the shape of concentric circles was observed, and good magnetic recording/reproducing characteristics were obtained.

Practical Example 5

A borosilicate glass substrate containing 58% by weight of $SiO_2$ was polished and cleaned so that the half-value width of the bound energy at the surface was 2.10 eV. When mirror polishing was then performed on the glass substrate, an ultrasmooth surface having a roughness of Ra=0.15 nm was obtained uniformly all over the surface thereof. When a perpendicular magnetic film was then formed on this glass substrate, a film of minute and uniform magnetic particles was obtained, and good magnetic signal reproduction characteristics were obtained.

Comparative Example 1

An aluminosilicate glass substrate containing 50% by weight of $SiO_2$ was polished and cleaned so that the shift amount of the bound energy at the surface was 0.15 eV. When texturing was then performed over the entire surface of the glass substrate, a pattern of stripes in the shape of concentric circles was obtained thereon, but the width, depth, and density of the stripes were non-uniform. When a magnetic film was then formed on this glass substrate, the magnetic layer had a partly disturbed magnetic orientation, and magnetic noise was large, resulting in unsatisfactory magnetic characteristics.

Comparative Example 2

A soda-lime glass substrate containing 65% by weight of $SiO_2$ was polished and cleaned so that the half-value width of the bound energy at the surface was 2.20 eV. Then mirror polishing was performed on the glass substrate to make it smooth, but the obtained smoothness was unsatisfactory, with Ra=0.40 nm, and the roughness varied from part to part. When a magnetic film was then formed on this glass substrate, the magnetic particles were unsatisfactorily minute, and large interference noise was observed among particles; thus, it was impossible to obtain magnetic signal reproduction characteristics good enough to obtain the desired recording density.

What is claimed is:

1. A method for fabricating a magnetic disk, comprising:
   fabricating a magnetic disk glass substrate containing $SiO_2$ as a main ingredient thereof, the fabricating comprising:
   polishing a surface of the glass substrate to produce a polished glass substrate; and
   inspecting the polished glass substrate to check whether or not, at a topmost surface portion thereof, a given property of a bound energy of a Si atom of the $SiO_2$ with respect to electrons of the Si atom occupying a 2P orbit of the Si atom as determined by XPS is equal to or less than a predetermined value, wherein the given property is a shift amount of the bound energy and the predetermined value is less than or equal to 0.10 eV; and
   forming a magnetic recording layer on the inspected polished glass substrate when the inspecting determines that the given property is equal to or less than the predetermined value.

2. The method according to claim 1, further comprising: performing ultraprecision polishing on the glass substrate when the glass substrate has passed the inspecting when the given property is equal to or less than the predetermined value and prior to forming the magnetic recording layer.

3. The method according to claim 2, wherein, after ultraprecision polishing, the topmost surface portion of the glass substrate has a surface roughness Ra of 0.3 nm or less.

4. A method for fabricating a magnetic disk, comprising:
   fabricating a magnetic disk glass substrate containing $SiO_2$ as a main ingredient thereof, the fabricating comprising:
   polishing a surface of the glass substrate to produce a polished glass substrate; and
   inspecting the polished glass substrate to check whether or not, at a topmost surface portion thereof, a given property of a bound energy of a Si atom of the $SiO_2$ with respect to electrons of the Si atom occupying a 2P orbit of the Si atom as determined by XPS is equal to or less than a predetermined value, wherein the given property is a half-value width of a distribution of the bound energy and the predetermined value is less than or equal to 2.15 eV; and
   forming a magnetic recording layer on the inspected polished glass substrate when the inspecting determines that the given property is equal to or less than the predetermined value.

5. The method according to claim 4, further comprising: performing ultraprecision polishing on the glass substrate when the glass substrate has passed the inspecting when the given property is equal to or less than the predetermined value and prior to forming the magnetic recording layer.

6. The method according to claim 5, wherein, after ultraprecision polishing, the topmost surface portion of the glass substrate has a surface roughness Ra of 0.3 nm or less.

* * * * *